US012479699B2

(12) United States Patent
Lo Jacono et al.

(10) Patent No.: US 12,479,699 B2
(45) Date of Patent: Nov. 25, 2025

(54) ROLLER GUIDE SHOE FOR GUIDING AN ELEVATOR CAR OF AN ELEVATOR

(71) Applicant: Inventio AG, Hergiswil (CH)

(72) Inventors: Romeo Lo Jacono, Gravesano (CH); Volker Zapf, Kriens-Obernau (CH); Alessandro D'Apice, Ebikon (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/571,282

(22) PCT Filed: Jun. 23, 2022

(86) PCT No.: PCT/EP2022/067165

§ 371 (c)(1),
(2) Date: Dec. 18, 2023

(87) PCT Pub. No.: WO2022/268949

PCT Pub. Date: Dec. 29, 2022

(65) Prior Publication Data

US 2024/0286872 A1 Aug. 29, 2024

(30) Foreign Application Priority Data

Jun. 25, 2021 (EP) .................................... 21181811

(51) Int. Cl.
*B66B 7/04* (2006.01)
*B66B 7/02* (2006.01)

(52) U.S. Cl.
CPC .............. *B66B 7/046* (2013.01); *B66B 7/022* (2013.01)

(58) Field of Classification Search
CPC ................................ B66B 7/046; B66B 7/022
See application file for complete search history.

(56) References Cited

U.S. PATENT DOCUMENTS 5,107,963 A * 4/1992 Rocca ..................... B66B 7/048 267/168
2017/0057786 A1* 3/2017 Witczak .................. B66B 7/046

FOREIGN PATENT DOCUMENTS

DE 3505979 C2 * 10/1993 ............. B66B 7/046
JP H03288782 A 12/1991
JP 2000044140 A * 2/2000 ............. B66B 7/046
JP 2000302357 A * 10/2000 ............. B66B 7/046
WO 2020127303 A1 6/2020
WO 2020127322 A1 6/2020
WO 2020127787 A1 6/2020

* cited by examiner

*Primary Examiner* — Diem M Tran
(74) *Attorney, Agent, or Firm* — Shumaker, Loop & Kendrick, LLP

(57) ABSTRACT

An elevator has an elevator car that is guided on two mutually opposite guide rails in an elevator shaft. The guide rails each contain a U-shaped guide channel with a frontal guide surface and two lateral guide surfaces. Roller guide shoes are provided for guiding the elevator car. Each of the roller guide shoes has two rollers mounted on a common axle so as to rotate freely about an axis of rotation for guiding along the frontal guide surface of the U-shaped guide channel and a guide roller received between the two lateral guide surfaces of the U-shaped guide channel for lateral guidance. Covers are arranged upstream of the two rollers for covering the respective rollers, wherein the covers form an emergency guide.

14 Claims, 3 Drawing Sheets

ROLLER GUIDE SHOE FOR GUIDING AN ELEVATOR CAR OF AN ELEVATOR

FIELD

The invention relates to a roller guide shoe. Furthermore, the invention relates to an elevator, the elevator car of which is equipped with such roller guide shoes.

BACKGROUND

Elevators for conveying persons and goods contain elevator cars that can be moved up and down in an elevator shaft. The elevator cars can be moved in the vertical elevator shaft via support elements, for example in the form of support cables or support belts, by means of a drive unit. In addition to the elevator car, the elevator system usually comprises at least one counterweight that is moved in an opposite direction in the elevator shaft. In this case, the elevator car and the at least one counterweight run in guide rails. Guide shoes are usually used to guide elevator cars and counterweights, it being possible for the guide shoes to be designed as sliding guide shoes or roller guide shoes.

To ensure that the elevator car is linearly guided in a sufficiently precise manner, guide rails are used which are fastened in the elevator shaft. T-shaped metal profiles are known and used for a long time already. The T-shaped profile has a rail foot and a rail web mounted on a shaft wall. The rail web has two opposing guide surfaces as well as an end-face guide surface on which a sliding or roller guide shoe can be moved along slidingly or in a rolling manner. Besides the guide function, the guide surfaces of the rail web also serve as contact surfaces for safety devices with which elevator cars can be braked to stop the car. The safety device can also be a safety brake for catching the car. The guide rail designed as a T-profile has proven successful for many years.

However, there are also guide rails for guiding elevator cars that comprise a U-shaped guide channel. Such a guide rail is known, for example, from WO 2020/127787 A1. This guide rail contains guide contours both for the elevator car and for the counterweight in the same component. The guide contour for the elevator car is designed as a U-shaped guide channel. The elevator car has guide shoes which are received in the U-shaped or groove-like guide channel of the elevator rail.

SUMMARY

It is an object of the present invention to avoid the known disadvantages and, in particular, to provide a roller guide shoe with which the elevator car may be guided in a safe and reliable manner. Furthermore, the roller guide shoe should also enable high ride comfort.

According to the invention, these and other objects are achieved by the roller guide shoe having the features described herein. The roller guide shoe for an elevator for transporting passengers or goods is used to guide an elevator car or a counterweight along a guide rail extending in the travel or longitudinal direction. The guide rail has a U-shaped guide channel for receiving the roller guide shoe. The U-shaped guide channel may have two mutually opposite lateral guide surfaces and a frontal guide surface connecting the lateral guide surfaces to one another, wherein the lateral guide surfaces and the frontal guide surface define a "U" in cross section. The lateral guide surfaces preferably adjoin the frontal guide surface at a right angle. The two mutually opposite lateral guide surfaces can extend along a first direction in relation to the cross section. The frontal guide surface can extend along a second direction in cross section. The two directions, i.e., the first direction on the one hand and the second direction, on the other hand, can be perpendicular to one another in the case of a rectangular "U".

The roller guide shoe comprises two rollers for guiding along the frontal guide surface mounted so as to rotate freely about an axis of rotation and preferably spaced apart by the axle. During the travel of the car, the rollers can run on the frontal guide surface. The two rollers which are grouped in pairs result in an optimal end-face guidance of the elevator car. The rollers may preferably be mounted or attached on the free ends of the axle so as to be freely rotatable relative to one another. For the lateral guide, the roller guide shoe comprises a guide body which can be received between the lateral guide surfaces. Preferably, the guide body is guided in an oscillating manner between the lateral guide surfaces when the car travels. The guide body thus does not contact both lateral guide surfaces simultaneously.

According to a first embodiment, the guide body can be a guide roller, the roller axis of which extends at a right angle to the axle of the two rollers (or more precisely to the axis of rotation of the axle). The axis of rotation of the rollers can extend in the first direction mentioned above; the roller axis of the guide roller can extend in the aforementioned second direction.

For optimal guidance, it can be advantageous if the guide roller is at least 50% larger than the rollers with respect to the outer diameter and preferably at least twice as large.

It can be further advantageous if the rollers are spaced so far apart that they reach close to the outer diameter of the guide roller as seen in a vertical projection or in a projection defined by the longitudinal direction. If another guide body is used instead of the guide roller, for example, a carriage-like guide body for enabling a sliding guidance, the rollers would reach to the external dimension of this alternative guide body. The term "close" means a few mm.

The roller guide shoe can have an emergency guide. Thanks to the emergency guide, it is ensured that a guide function is maintained even in the event of failure of one or more rollers, for example due to bearing damage.

The roller guide shoe may be equipped with a cover for covering the rollers. For advantageous covering of the rollers, the cover may be arranged upstream of the rollers in the roller guide shoe. Particularly preferably, each roller can be associated with a cover each. The cover, which partially covers the respective roller on the peripheral side, prevents undesired soiling of the roller, in particular by dirt particles falling down from above. The cover can be arranged on a front side or, in the assembled state, on a top side in the roller guide shoe.

Particularly advantageously, the emergency guide is formed by the cover or covers, as a result of which a particularly effective and compact roller guide shoe is achievable.

The roller guide shoe may have a guide shoe housing with a support section for supporting the rollers and/or the guide body and with a fastening section for fastening the roller guide shoe to the elevator car. The support section and the fastening section can be at right angles to one another. The support section is designed to be two-dimensional or has a surface which specifies a plane (also called "support surface"). In the preferred exemplary embodiment, the axle or axis of rotation of the rollers extends parallel to this support surface, the roller axis of the guide roller extends at a right angle to the support surface. The fastening section can also be designed to be two-dimensional.

The support section and the fastening section can preferably be part of an integral structure and thus be monolithically connected to one another. This integral structure for forming the guide shoe housing can be produced from a high-strength plastic, for example in the form of an injection-molded part. Alternatively, it can be advantageous if the guide shoe housing comprising the support section and the fastening section is manufactured from a single sheet metal blank, which is erected from a two-dimensional position into an end position by means of bending processes. Such a roller guide shoe can be produced simply and cost-effectively.

The covers and/or the emergency guide can be formed by sheet metal segments which is or are part of the guide shoe housing produced from a sheet metal blank.

Alternatively, the guide shoe housing can be designed as two parts, wherein the two-part guide shoe housing has a base part comprising a fastening section and a support section as the first part and a support part attached to the base part in the support section as a second part. The emergency guide can be associated with the support part. The support part can be manufactured from a single sheet metal blank. The emergency guide can be formed from the sheet metal blank through a bending process. The support part can thus have been erected from a two-dimensional position into an end position by means of bending processes.

An extension piece with a hook-like engagement element, interacting with a web-like projection of the guide rail or another guide section of the guide rail, which forms a spring, can be integrally formed with or fastened to the fastening section for forming a derailment protection element. This web-like projection can form a braking section of the guide rail. The guide section and the braking section are spatially separated from one another in this guide rail.

Finally, a further aspect of the invention relates to an elevator with an elevator car which is equipped with the previously described roller guide shoes for guiding the elevator car on guide rails. The elevator further comprises two preferably mutually opposite guide rails for guiding the elevator car, wherein the guide rails extending in the longitudinal direction each contain a U-shaped guide channel.

The elevator with the elevator car may further have at least one counterweight which is connected to the elevator car via support means and can be moved in the opposite direction to the elevator car. The elevator may preferably have one counterweight or two counterweights per elevator car. The elevator may comprise guide rails, each of which serves as a linear guide for both an elevator car and a counterweight.

The elevator car may have a front side which is associated with a car door. Furthermore, the elevator car may have a rear side opposite the front side and two car sides which connect the front side and rear side to one another. The elevator may comprise, for example, an elevator car supported on the front side and two counter weights which are each connected to the elevator car via support means and which are movable in the opposite direction to the elevator car. The counterweights can be guided on mutually opposite counterweight guide rails, which counterweight guide rails are mounted on mutually opposite sides of the elevator shaft that are adjacent to the car sides. The guide rail for guiding the elevator car and the counterweight guide rail are formed by a common guide rail profile. This guide rail thus serves as a linear guide both for the elevator car and for the counterweights. Such an elevator with the elevator car supported on the front side is also known as "front bag elevator."

DESCRIPTION OF THE DRAWINGS

Further individual features and advantages of the invention can be derived from the following description of exemplary embodiments and from the drawings. In the drawings.

DETAILED DESCRIPTION

Figure 1:
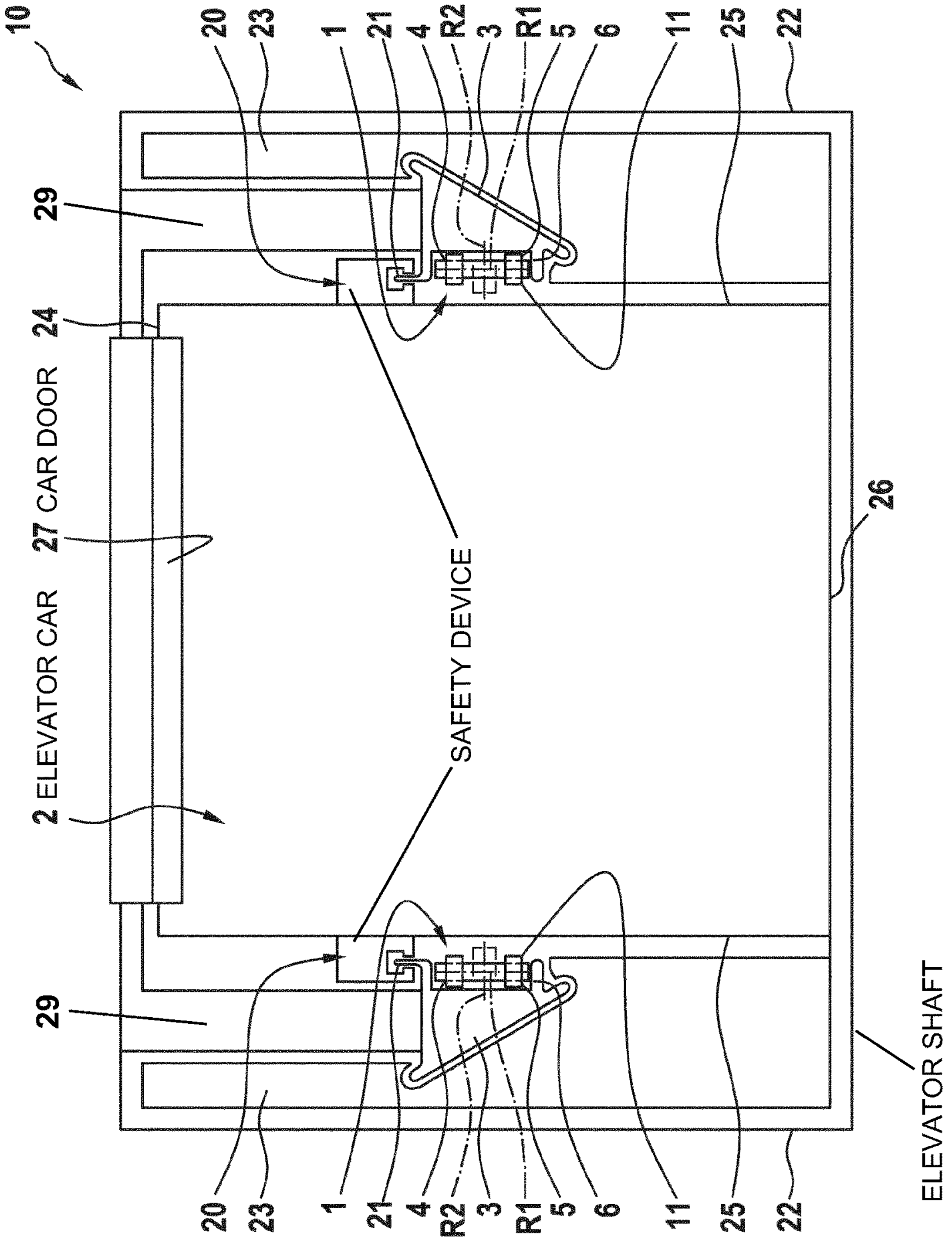
FIG. 1 shows a highly simplified view of a plan view of an elevator according to the invention with an elevator car equipped with roller guide shoes for guiding the elevator car along guide rails extending in the longitudinal direction.

FIG. 1 shows an elevator, denoted by 10, for a multi-story building. The building has an elevator shaft 22 in which an elevator car 2 can be moved vertically up and down to individual floors for transporting people or goods.

The elevator of FIG. 1 is designed as a traction elevator system with at least one counterweight 23 movable in the opposite direction to the elevator car 2. The elevator 10 shown here has two counterweights 23 as well as (not shown) support means and drives. The two drives (e.g., Koepe sheave drives) drive the respective support means (e.g., belts, steel ropes) and thus move the car 2 and the two counterweights 23 in opposite directions. Each drive is associated with one of the counterweights 23. Two mutually opposite guide rails 3 are provided on both sides of the elevator car 2 to guide the elevator car 2 and the counterweights 23. The elevator system 10 shown in the present exemplary embodiment is characterized by special guide rails 3 which serve as linear guides for both the elevator car 2 and the respective counterweights 23. The guide rails 3 are manufactured as one-piece rolled profiles.

The elevator car 2 has a front side 24 with a car door 27, a rear side 26 opposite the front side and two side walls 25, which connect the front side and rear side to one another. The elevator car 2 is supported on the front side. The guide rails 3 are located on mutually opposite sides of the elevator shaft 22, which sides are adjacent to the side walls 25. The guide rails 3 are fixed via horizontal supporting structures 29 which are fixed to the elevator shaft 22 in the region of the front side of thereof. The elevator system 10 is designed as a so-called "front bag elevator". Further details on the front bag elevator and the guidance of the car and the counterweights with common guide rails can be found in WO 2020/127303 A1 and WO 2020/127787 A1.

Each of the guide rails 3 comprises a U-shaped guide channel 11 in which a roller guide shoe 1 for guiding the elevator car 2 is accommodated. The roller guide shoe 1 has two rollers 4, 5 for end-face guidance and one guide roller 6 for lateral guidance. The respective axes of rotation of the rollers 4, 5 and the guide roller 6 are denoted by R1 and R2. Details on the structure and the operating principle of the roller guide shoe 1 can be gathered from the FIGS. 2 to 5 below.

It can further be seen in FIG. 1 that the respective counterweight 23 is guided along the guide rail 3 by means of guide arrangements which are only shown as an outline. Rectangle 20 denotes a safety device. The safety device 20 can also be a safety brake for catching the car. The safety brake is a device with which an overspeed of the elevator car in the downward direction is prevented. For example, solutions with catching wedges which can be actuated by force springs are known. The force springs are pretensioned by an electromagnet and the pretensioned force springs are released when required. However, the safety device 20 could be a car brake. With the car brake, the elevator car can be secured during a stop of the car. For catching or braking the elevator car 2, the safety device 20 interacts with a web-like projection 21 of the guide rail 3.

Figure 2:
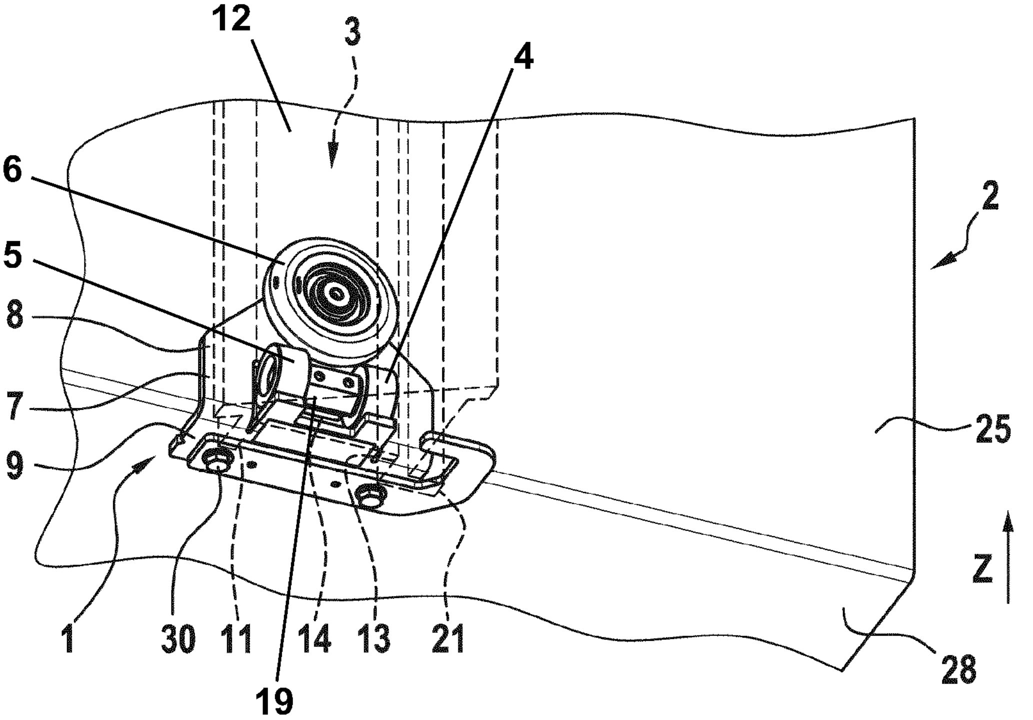
FIG. 2 shows a perspective partial view of an elevator car with a roller guide shoe and an associated guide rail.

FIG. 2 shows a roller guide shoe 1 which is arranged on the elevator car 2 in the region of the car floor 28. The direction of travel of the elevator car 2 is indicated by an arrow Z. As can be seen, the guide rail 3 shown in dashed lines is designed as a hollow profile, wherein in the present exemplary embodiment the guide rail 3 is manufactured as a one-piece rolled profile. The guide channel 11 has two mutually opposite lateral guide surfaces 13, the surfaces 13 facing each other, and a frontal guide surface 12 connecting them to one another. The frontal guide surface 12 and the lateral guide surfaces 13 adjoining at right angles thereto define a “U” in cross section. The rollers 4, 5 run on the frontal guide surface 12. The guide roller 6 is guided oscillatory between the lateral guide surfaces 13. The roller axis R2 extends at a right angle to the axis of rotation R1 of the two rollers 4, 5.

The two rollers 4, 5 are mounted on a common axle 19 so as to be freely rotatable. The rollers 4, 5, which are spaced apart from one another via the axle 19, enable a front-end guidance, which is distinguished, inter alia, by a high reliability and enables improved riding comfort.

Figure 3:
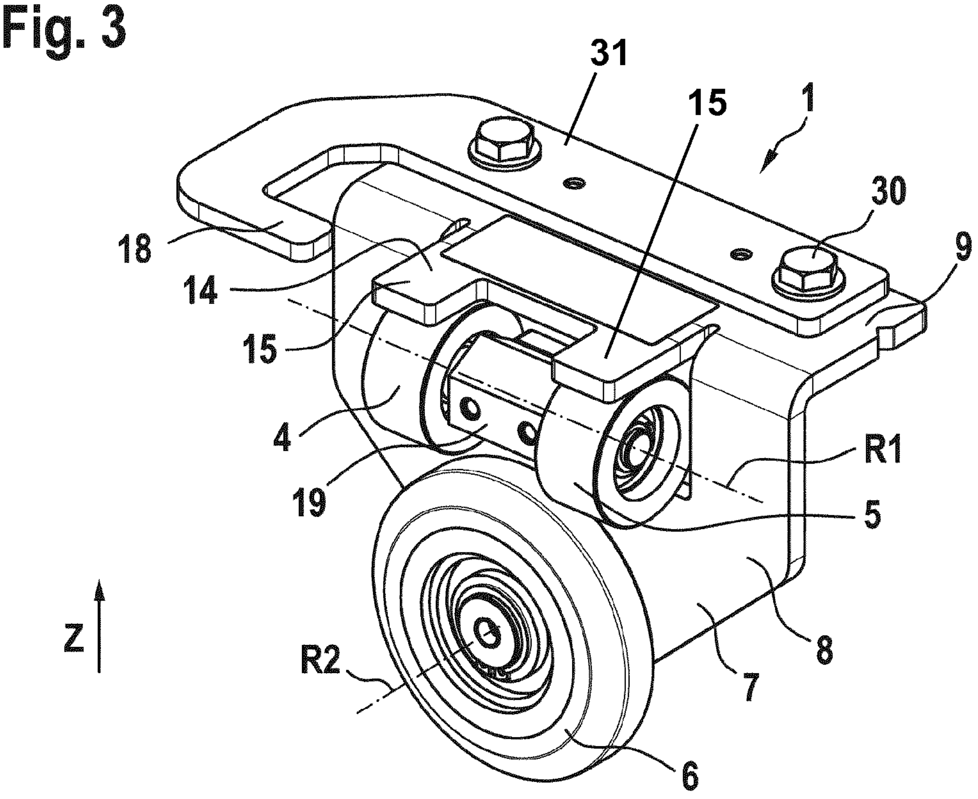
FIG. 3 shows a perspective view of the roller guide shoe for the elevator from FIG. 2.

As can be seen from FIG. 3, for example, the guide roller 6 has a significantly larger outer diameter than the rollers 4, 5. In the present case, the outer diameter of the guide roller 6 relative to the rollers 4, 5 is approximately twice as large. The rollers 4, 5 are spaced apart to such an extent that they extend close to the outer diameter of the guide roller 6.

The roller guide shoe 1 has a guide shoe housing 7 with a support section 8 and a fastening section 9 projecting at an angle from the support section. The support section 8 serves to support the rollers 4, 5 and the guide roller 6. The fastening section 9 serves to fasten the roller guide shoe 1 to the elevator car 2. The guide shoe housing 7 with support section 8 and fastening section 9 is an L-shaped. Thanks to the L-shape, the roller guide shoe 1 can be attached to the edge between the horizontal underside of the car floor 28 and the vertical outer side of the car wall 25 and fastened to the elevator car 2 by means of screws 30.

Figure 4:
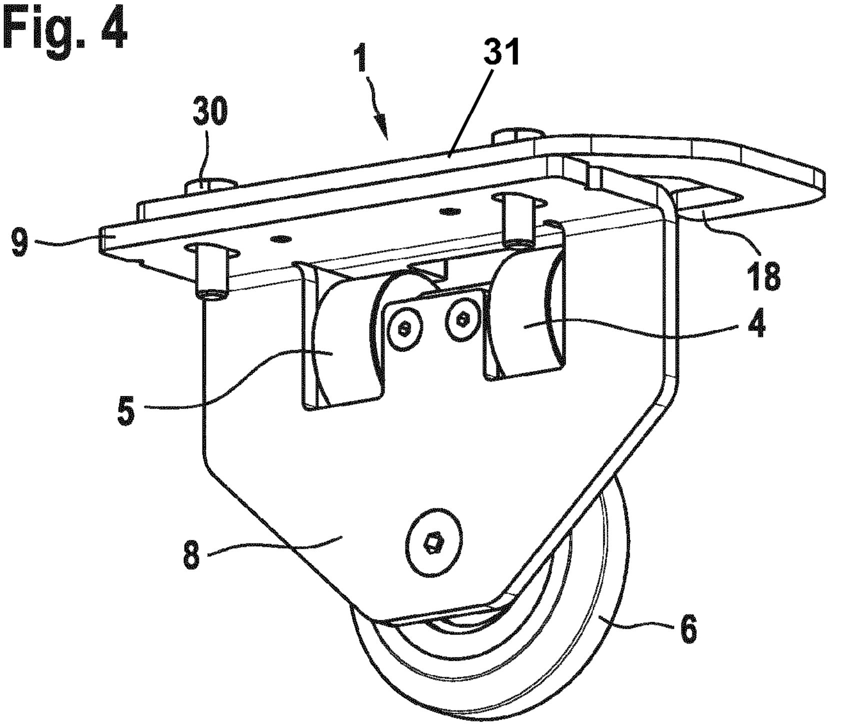
FIG. 4 shows a perspective view of the roller guide shoe for an elevator in a view from behind.

Further details of this roller guide shoe 1 can be taken from FIGS. 3 and 4. The guide shoe housing 7 with the support section 8 and the fastening section 9 is produced from a single sheet metal blank, which is erected from a two-dimensional position into the end position shown here by means of bending processes. The two-dimensional support section 8 defines a support surface. The axis of rotation R1 of the rollers 4, 5 extends parallel to this support surface; the roller axis R2 of the guide roller 6 extends at a right angle to the support surface support section 8. The roller guide shoe 1 further comprises an emergency guide 14 which is part of the guide shoe housing 7 produced from a sheet metal blank. The emergency guide 14 can simply be formed after corresponding cutting operations during the bending of the sheet metal blank. To partially cover the rollers 4, 5, the emergency guide 14 has two covers 15, each of the covers 15 being arranged upstream of a respective roller 4, 5. An extension piece 31 is fastened to the fastening section 9. This extension piece 31 has a hook-like engagement member 18 which interacts with the web-like projection 21 of the guide rail 3 forming a spring for forming a derailment protection device. The hook-like engagement member 18 surrounds the guide rail 3 in the region of the projection 21 and thus ensures that, for example, in the case of an earthquake, derailment can be prevented.

Figure 5:
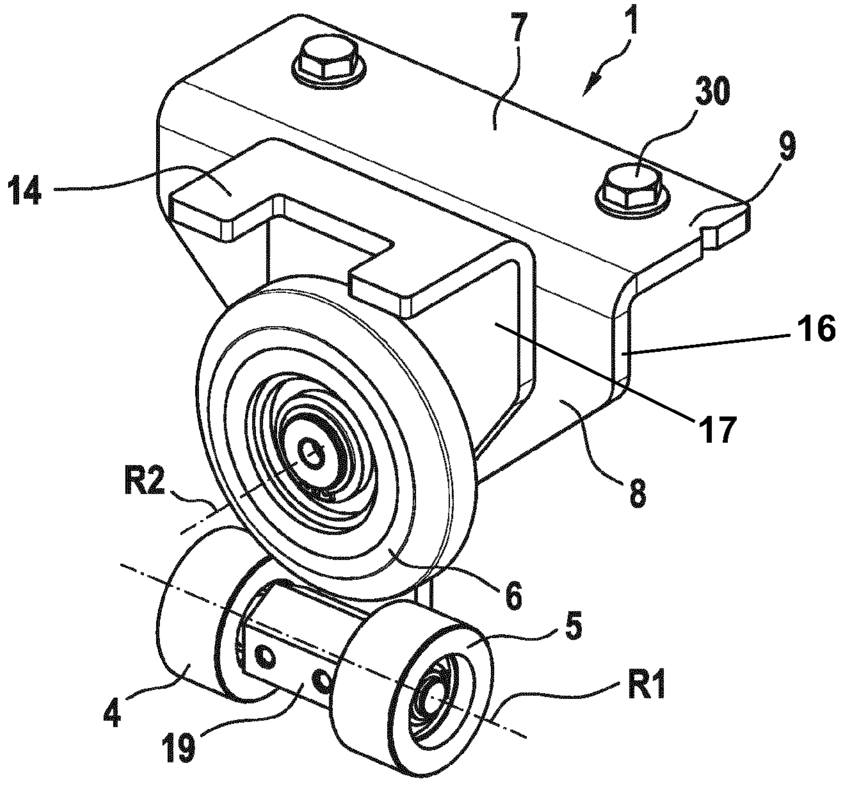
FIG. 5 shows a variant of the roller guide shoe from FIG. 2.

FIG. 5 shows a variant of a roller guide shoe 1 in which the guide shoe housing 7 is designed in two parts. The two-part guide shoe housing 7 has a base part 16 formed from sheet metal with a fastening section 9 and a sheet metal section formed at a right angle thereon, on which a second part is arranged. The second part forms a support part 17 with support section 8, which is associated with the support section 8 for supporting the rollers 4, 5 and the guide roller 6. The support part 17 has a bend which forms the emergency guide 14. Another difference in roller guide shoe 1 of the exemplary embodiment according to FIG. 5 to the preceding embodiment consists in a different arrangement of the guide roller 6 and the rollers 4, 5. In FIG. 5, the rollers 4, 5 are arranged on the lower end or the end of the support section 8 that faces away from the fastening section 9.

The roller guide shoes 1 shown in FIGS. 3 to 5 do not necessarily have to be used only in front bag elevators, but can also be used in other elevators in which the elevator cars are guided on guide rails with U-shaped guide channels.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A roller guide shoe for guiding an elevator car of an elevator along a guide rail extending in a longitudinal direction, the guide rail having a U-shaped guide channel, the roller guide shoe comprising:

two rollers mounted on a common axle and rotating freely about an axis of rotation, the two rollers being adapted to engage and guide along a frontal guide surface of the U-shaped guide channel;

a guide body adapted to be received in the U-shaped guide channel between facing opposed lateral guide surfaces of the U-shaped guide channel thereby providing lateral guidance of the roller guide shoe along the guide rail;

wherein the guide body is a guide roller rotatable about a roller axis that extends at a right angle to the axis of rotation of the two rollers and the guide roller has an outer diameter that is at least 50% larger than outer diameters of the two rollers; and a guide shoe housing to which the two rollers and the guide body are attached.

2. The roller guide shoe according to claim 1 wherein the guide roller has an outer diameter that is at least twice as large as outer diameters of the two rollers.

3. The roller guide shoe according to claim 1 including a cover covering the two rollers upstream of the two rollers in the longitudinal direction.

4. The roller guide shoe according to claim 3 wherein the cover is adapted to function as an emergency guide for the elevator car.

5. The roller guide shoe according to claim 3 wherein the cover is formed as two covers, each of the covers covering an associated one of the two rollers.

6. The roller guide shoe according to claim 1 wherein the guide shoe housing has a support section, the support section supporting at least one of the two rollers and the guide body, and a fastening section adapted to fasten the roller guide shoe to the elevator car, wherein the support section and the fastening section extend at right angles to one another.

7. The roller guide shoe according to claim 6 wherein the guide shoe housing having the support section and the fastening section is formed from a single sheet metal blank.

8. The roller guide shoe according to claim 7 including two covers, each of the covers covering an associated one of the two rollers, and wherein the covers are sheet metal segments of the guide shoe housing formed from the sheet metal blank.

9. The roller guide shoe according to claim 6 including an extension piece having a hook-like engagement member adapted to interact with a projection on the guide rail to form a spring and function as a derailment protection device, the extension piece being integrally formed with or fastened to the fastening section.

10. An elevator comprising:

an elevator car;

two guide rails guiding the elevator car and extending in a longitudinal direction, each of the guide rails having a U-shaped guide channel; and wherein the elevator car is equipped with at least two of the roller guide shoe according to claim 1 to guide the elevator car on the guide rails.

11. A roller guide shoe for guiding an elevator car of an elevator along a guide rail extending in a longitudinal direction, the guide rail having a U-shaped guide channel, the roller guide shoe comprising:

two rollers mounted on a common axle and rotating freely about an axis of rotation, the two rollers being adapted to engage and guide along a frontal guide surface of the U-shaped guide channel;

a guide body adapted to be received in the U-shaped guide channel between facing opposed lateral guide surfaces of the U-shaped guide channel thereby providing lateral guidance of the roller guide shoe along the guide rail;

a cover covering the two rollers upstream of the two rollers in the longitudinal direction, wherein the cover is adapted to function as an emergency guide for the elevator car; and a guide shoe housing to which the two rollers and the guide body are attached.

12. An elevator comprising:

an elevator car;

two guide rails guiding the elevator car and extending in a longitudinal direction, each of the guide rails having a U-shaped guide channel; and wherein the elevator car is equipped with at least two of the roller guide shoe according to claim 11 to guide the elevator car on the guide rails.

13. A roller guide shoe for guiding an elevator car of an elevator along a guide rail extending in a longitudinal direction, the guide rail having a U-shaped guide channel, the roller guide shoe comprising:

two rollers mounted on a common axle and rotating freely about an axis of rotation, the two rollers being adapted to engage and guide along a frontal guide surface of the U-shaped guide channel;

a guide body adapted to be received in the U-shaped guide channel between facing opposed lateral guide surfaces of the U-shaped guide channel thereby providing lateral guidance of the roller guide shoe along the guide rail; and a guide shoe housing to which the two rollers and the guide body are attached, wherein the guide shoe housing has a support section, the support section supporting at least one of the two rollers and the guide body, and a fastening section adapted to fasten the roller guide shoe to the elevator car, wherein the support section and the fastening section extend at right angles to one another, and wherein the guide shoe housing having the support section and the fastening section is formed from a single sheet metal blank.

14. An elevator comprising:

an elevator car;

two guide rails guiding the elevator car and extending in a longitudinal direction, each of the guide rails having a U-shaped guide channel; and wherein the elevator car is equipped with at least two of the roller guide shoe according to claim 13 to guide the elevator car on the guide rails.

* * * * *